United States Patent
Sugimoto (10) Patent No.: US 10,138,792 B2
(45) Date of Patent: Nov. 27, 2018

(54) EXHAUST GAS CONTROL APPARATUS AND CONTROL METHOD FOR EXHAUST GAS CONTROL APPARATUS

(71) Applicant: Toyota Jidosha Kabushiki Kaisha, Toyota-shi, Aichi-ken (JP)

(72) Inventor: Kazuhiro Sugimoto, Kanagawa-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/958,498

(22) Filed: Apr. 20, 2018

(65) Prior Publication Data

US 2018/0306086 A1   Oct. 25, 2018

(30) Foreign Application Priority Data

Apr. 25, 2017   (JP) ................................ 2017-086424

(51) Int. Cl.
   *F01N 3/01*   (2006.01)
   *F01N 9/00*   (2006.01)

(52) U.S. Cl.
   CPC .............. *F01N 9/002* (2013.01); *F01N 3/01* (2013.01); *F01N 2240/04* (2013.01); *F01N 2240/28* (2013.01); *F01N 2240/38* (2013.01); *F01N 2250/08* (2013.01)

(58) Field of Classification Search
   None
   See application file for complete search history.

(56) References Cited

FOREIGN PATENT DOCUMENTS

| EP | 3029293 A1 * | 6/2016 | ............... B03C 3/41 |
|---|---|---|---|
| EP | 3029293 A1 | 6/2016 | |
| JP | 2012-170869 A | 9/2012 | |
| JP | 2016-107173 A | 6/2016 | |

* cited by examiner

*Primary Examiner* — Walter D. Griffin
*Assistant Examiner* — Jelitza M Perez
(74) *Attorney, Agent, or Firm* — Dinsmore & Shohl LLP (57) ABSTRACT

An exhaust gas control apparatus includes a dust collection device, an oxidation treatment device, and an ECU. The dust collection device applies a DC voltage between a charging electrode and a counter electrode, and collects particulate matter on an oxidation substrate. The ECU estimates a distribution of a deposition amount of the particulate matter deposited on the oxidation substrate in a flow direction of exhaust gas, based on input information including at least a flow rate of exhaust gas and a mass of particulate matter in exhaust gas, setting information including at least an electric field intensity between the charging electrode and the counter electrode, and history information on the oxidation treatment. The ECU carries out the oxidation treatment when the deposition amount of at least a part of the deposited particulate matter exceeds a threshold.

7 Claims, 8 Drawing Sheets

EXHAUST GAS CONTROL APPARATUS AND CONTROL METHOD FOR EXHAUST GAS CONTROL APPARATUS

CROSS-REFERENCE TO RELATED APPLICATIONS

This application claims priority to Japanese Patent Application No. 2017-086424 filed on Apr. 25, 2017, which is incorporated herein by reference in its entirety including the specification, drawings and abstract.

BACKGROUND

1. Technical Field

The disclosure relates to an exhaust gas control apparatus that purifies exhaust gas by collecting the particulate matter contained in exhaust gas and subjecting the collected particulate matter to an oxidation treatment, and a control method for the exhaust gas control apparatus.

2. Description of Related Art

In each of Japanese Patent Application Publication No. 2012-170869 (JP 2012-170869 A) and Japanese Patent Application Publication No. 2016-107173 (JP 2016-107173 A), there is disclosed an exhaust gas control apparatus that subjects the particulate matter contained in exhaust gas to an oxidation treatment with the aid of discharge plasma. In concrete terms, this kind of exhaust gas control apparatus is configured to collect the particulate matter on an oxidation substrate through electric dust collection, and to subject the particulate matter deposited on the oxidation substrate to the oxidation treatment through discharge plasma.

SUMMARY

In the aforementioned exhaust gas control apparatus, the oxidation treatment of the particulate matter through discharge plasma is carried out as soon as a certain amount of particulate matter is deposited on the oxidation substrate. However, the particulate matter is not always uniformly deposited, and the deposition of the particulate matter may be biased. In this case, even in the case where the total deposition amount has not reached a reference for carrying out the oxidation treatment, the once-deposited particulate matter may be detached and flow out at a location where a large amount of particulate matter is deposited. The particulate matter that has once been detached has a large particle diameter and becomes qualitatively difficult to charge. It is therefore difficult to collect this particulate matter again downstream.

The disclosure provides an exhaust gas control apparatus capable of restraining particulate matter from being detached as a result of the bias in deposition of the collected particulate matter, and a control method for the exhaust gas control apparatus.

A first aspect of the disclosure is an exhaust gas control apparatus that includes a dust collection device, an oxidation treatment device, and an electronic control unit. The dust collection device is configured to apply a direct current voltage (hereinafter, also referred as a DC voltage) between a charging electrode and a counter electrode, and to collect particulate matter on an oxidation substrate that is arranged inside the counter electrode. The charging electrode is arranged in a flow channel for exhaust gas containing particulate matter. The counter electrode constitutes at least a part of an inner wall surface of the flow channel. The oxidation treatment device is configured to apply an alternating current voltage (hereinafter, also referred as an AC voltage) between an oxidation electrode and the counter electrode, and to subject the particulate matter deposited on the oxidation substrate to an oxidation treatment. The oxidation electrode is provided in the oxidation substrate and is at least partially covered with a dielectric. The electronic control unit configured to control the dust collection device and the oxidation treatment device.

The electronic control unit is configured to estimate a distribution of a deposition amount of the particulate matter deposited on the oxidation substrate in a flow direction of exhaust gas, based on input information including at least a flow rate of exhaust gas and a mass of the particulate matter in exhaust gas, setting information including at least an electric field intensity between the charging electrode and the counter electrode, and history information on the oxidation treatment by the oxidation treatment device. The electronic control unit is configured to carry out the oxidation treatment by the oxidation treatment device when the deposition amount of at least a part of the deposited particulate matter exceeds a threshold.

In the aforementioned configuration, the input information is information on a condition of the treated exhaust gas. The setting information is information on the setting on the side of the device for collecting exhaust gas. The history information is information on the history of the oxidation treatment carried out so far, namely, information on a decrease in the deposition amount through the oxidation treatment. Besides, the deposition amount mentioned herein is a deposition amount per predetermined length in the flow direction of exhaust gas. The threshold is, for example, an upper limit of the range of the deposition amount where detachment of the particulate matter is confined within a permissible range. According to this configuration, when the deposition of the collected particulate matter is biased and the deposition amount exceeds the threshold somewhere due to the bias, the oxidation treatment is carried out by the oxidation treatment device even in the case where the deposition amount is sufficiently smaller than the threshold as a whole. Thus, the particulate matter is restrained from being detached as a result of the bias in deposition of the collected particulate matter.

In the exhaust gas control apparatus, the oxidation electrode may be constituted of a plurality of partial electrodes that are aligned in the flow direction of exhaust gas. The oxidation treatment device may be configured to be able to carry out the oxidation treatment individually for each of the partial electrodes. According to this configuration, an AC voltage can be applied only to a location where the oxidation treatment is desired to be carried out, so the amount of electric power consumption can be held small. In the exhaust gas control apparatus, the electronic control unit may be configured to carry out the oxidation treatment by that one of the partial electrodes which corresponds to a region where the deposition amount exceeds the threshold (in other words, the electronic control unit may be configured to carry out the oxidation treatment by one of the partial electrodes, the one of the partial electrodes corresponding to a region where the deposition amount exceeds the threshold). According to this, only the location where the particulate matter may be detached can be subjected to the oxidation treatment, so the particulate matter can be restrained from being detached while holding the amount of electric power consumption small.

In the exhaust gas control apparatus, the charging electrode may include a plurality of discharge portions that are aligned in the flow direction of exhaust gas, and the dust collection device may be configured to be able to carry out discharge individually for each of the discharge portions. In this case, the electronic control unit may be further equipped with a charging position control unit that changes a charging position on the oxidation substrate by changing over that one of the discharge portions which is to be discharged. The distribution of the deposition amount of the particulate matter on the oxidation matter can also be changed by changing the charging position on the oxidation substrate. In the exhaust gas control apparatus, the electronic control unit may be configured to change over that one of the discharge portions which is to be discharged, in accordance with a change in the distribution of the deposition amount. For example, the amount of bias in deposition of the particulate matter in the flow direction of exhaust gas can be reduced by, for example, changing over the discharge portion to a position where the deposition amount on the oxidation substrate is small.

In the exhaust gas control apparatus, the electronic control unit may be configured to carry out the oxidation treatment by that one of the partial electrodes which corresponds to a region where the deposition amount exceeds the threshold. The electronic control unit may be configured to change over that one of the discharge portions which is to be discharged in such a manner as to shift the charging position from a position of that one of the partial electrodes for which the oxidation treatment is carried out to another position, when a deposition speed of the particulate matter at the position of that one of the partial electrodes for which the oxidation treatment is carried out is higher than an oxidation speed of the particulate matter. According to this, the deposited particulate matter can be restrained from being detached due to a delay in the oxidation treatment.

A second aspect of the disclosure provides a control method for an exhaust gas control apparatus. The exhaust gas control apparatus includes a dust collection device, an oxidation treatment device, and an electronic control unit. The dust collection device is configured to apply a DC voltage between a charging electrode and a counter electrode, and to collect the particulate matter on an oxidation substrate that is arranged inside the counter electrode. The charging electrode is arranged in a flow channel for exhaust gas containing particulate matter. The counter electrode constitutes at least a part of an inner wall surface of the flow channel. The oxidation treatment device is configured to apply an AC voltage between an oxidation electrode and the counter electrode, and to subject the particulate matter deposited on the oxidation substrate to an oxidation treatment. The oxidation electrode is provided in the oxidation substrate and is at least partially covered with a dielectric. The electronic control unit is configured to control the dust collection device and the oxidation treatment device. The control method includes: estimating, by the electronic control unit, a distribution of a deposition amount of the particulate matter deposited on the oxidation substrate in a flow direction of exhaust gas, based on input information including at least a flow rate of exhaust gas and a mass of the particulate matter in exhaust gas, setting information including at least an electric field intensity between the charging electrode and the counter electrode, and history information on the oxidation treatment by the oxidation treatment device; and carrying out, by the electronic control unit, the oxidation treatment by the oxidation treatment device when the deposition amount of at least a part of the deposited particulate matter exceeds a threshold.

As described above, the exhaust gas control apparatus according to the disclosure estimates the distribution of the deposition amount of the particulate matter deposited on the oxidation substrate in the flow direction of exhaust gas, and carries out the oxidation treatment by the oxidation treatment device when the deposition amount at least partially exceeds the threshold. Due to this operation of the exhaust gas control apparatus according to the disclosure, the particulate matter is restrained from being detached as a result of the bias in deposition of the collected particulate matter.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The embodiments of the disclosure will be described hereinafter with reference to the drawings. It should be noted, however, that when numerical values such as the number, quantity, amount, range and the like of each element are mentioned in the following embodiments, the disclosure is not limited to the mentioned numerical values unless otherwise specified or unless the disclosure is obviously confined thereto in principle. Besides, the structures, steps and the like described in the following embodiments of the disclosure are not indispensable to the disclosure unless otherwise specified or unless the disclosure is obviously confined thereto in principle.

Structure of Exhaust Gas Control Apparatus

Figure 1:
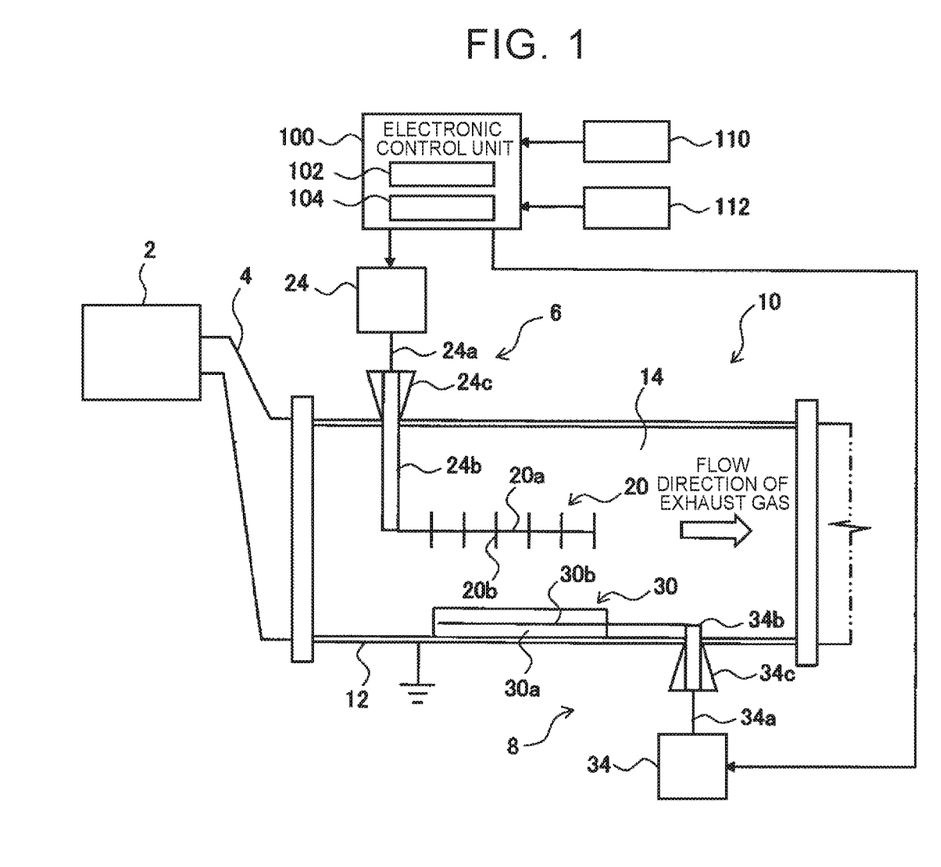
FIG. 1 is a view showing the structure of an exhaust gas control apparatus according to the first embodiment.

First of all, the structure of an exhaust gas control apparatus according to the first embodiment will be described. FIG. 1 is a view showing the structure of the exhaust gas control apparatus according to the first embodiment. The exhaust gas control apparatus 10 is an exhaust gas control apparatus for an automobile, and is provided in an exhaust pipe 4 of an internal combustion engine 2. Incidentally, there is no limit to the type of the internal combustion engine 2. For example, the internal combustion engine 2 may be a spark ignition-type internal combustion engine or a compression ignition-type internal combustion engine.

The exhaust gas control apparatus 10 has a tubular outer shell 12. An inner space 14 defined by the outer shell 12 serves as a flow channel through which exhaust gas flows. This inner space 14 will be referred to hereinafter as an exhaust gas flow channel 14. The exhaust gas control apparatus 10 is equipped with a dust collection device 6 that collects particulate matter (hereinafter referred to as PM) contained in exhaust gas, an oxidation treatment device 8 that subjects the collected PM to an oxidation treatment, and an electronic control unit 100 that controls the dust collection device 6 and the oxidation treatment device 8.

The dust collection device 6 is equipped with a charging electrode 20. The charging electrode 20 has a main shaft portion 20a that is arranged at a central portion of the exhaust gas flow channel 14 and that extends in a longitudinal direction of the exhaust gas flow channel 14, and a plurality of discharge portions 20b that protrude from the main shaft portion 20a in a radial direction of the exhaust gas flow channel 14. The plurality of the discharge portions 20b are aligned in a flow direction of exhaust gas at intervals of a certain distance. The dust collection device 6 includes the outer shell 12 that constitutes an inner wall surface of the exhaust gas flow channel 14, as a counter electrode that is paired with the charging electrode 20. The outer shell 12 is at least partially conductive, and the conductive part thereof functions as the counter electrode. The part of the outer shell 12 that functions as the counter electrode is grounded. The dust collection device 6 is equipped with a DC voltage generation device 24 for applying a high DC voltage between the charging electrode 20 and the outer shell 12. The DC voltage generation device 24 is connected to the charging electrode 20 via a lead wire 24a and an insulator 24b. The insulator 24b is fixed to the outer shell 12 by a silicon plug 24c.

The oxidation treatment device 8 is equipped with an oxidation substrate 30. The oxidation substrate 30 is provided inside the outer shell 12, and in a lower part of the outer shell 12 in the case where the outer shell 12 is halved by a horizontal plane passing through a central axis thereof. The oxidation substrate 30 is provided in such a manner as to cover a region where the plurality of the discharge portions 20b of the charging electrode 20 are arranged in the longitudinal direction of the exhaust gas flow channel 14. The oxidation substrate 30 is constituted of an oxidation electrode 30b and a dielectric 30a that covers the oxidation electrode 30b. The dielectric 30a is arranged in contact with an inner surface of the outer shell 12. The oxidation treatment device 8 includes the outer shell 12 as a counter electrode that is paired with the oxidation electrode 30b. The outer shell 12 has a conductive surface that is in contact with the oxidation substrate 30. The oxidation treatment device 8 is equipped with an alternating current voltage generation device 34 for applying a high AC voltage between the oxidation electrode 30b and the outer shell 12. The AC voltage generation device 34 is connected to the oxidation electrode 30b via a lead wire 34a and an insulator 34b. The insulator 34b is fixed to the outer shell 12 by a silicon plug 34c.

The electronic control unit 100 is equipped with at least one processor 102 and at least one memory 104. A computer program stored in the memory 104 is read out and executed by the processor 102. Thus, various functions are realized in the electronic control unit 100. Various sensors such as an engine rotational speed sensor 110, an airflow meter 112 and the like are electrically connected to the electronic control unit 100. The electronic control unit 100 acquires input information that is needed to control the dust collection device 6 or the oxidation treatment device 8, from signals of these various sensors. For example, a flow rate of air sucked into the internal combustion engine 2 is obtained from the signal of the airflow meter 112, and a flow rate of exhaust gas treated by the exhaust gas control apparatus 10 is obtained from this intake air flow rate. Besides, a load factor of the internal combustion engine 2 is obtained from the intake air flow rate obtained from the signal of the airflow meter 112, and an engine rotational speed obtained from the signal of the engine rotational speed sensor 110. When the load factor of the internal combustion engine 2 and the engine rotational speed are fixed, an operating state of the internal combustion engine 2 is specified, and an amount of PM in exhaust gas is obtained from the operating state of the internal combustion engine 2.

Next, the operation of the exhaust gas control apparatus 10 having the above-mentioned structure will be described. The electronic control unit 100 can operate the dust collection device 6 and the oxidation treatment device 8 independently of each other. When the electronic control unit 100 operates the dust collection device 6, a high DC voltage is applied between the charging electrode 20 and the outer shell 12 from the DC voltage generation device 24. Thus, ions fly out toward the outer shell 12 from the discharge portions 20b of the charging electrode 20, and the PM contained in exhaust gas is negatively charged. The negatively charged PM is introduced to the outer shell 12 side by ionic wind, and is collected onto the oxidation substrate 30 that is arranged inside the outer shell 12.

When the electronic control unit 100 operates the oxidation treatment device 8, a high AC voltage is applied between the oxidation electrode 30b in the oxidation substrate 30 and the outer shell 12 from the AC voltage generation device 34. Thus, a discharge phenomenon occurs on a surface of the dielectric 30a around the oxidation electrode 30b, and discharge plasma is created in a region around the surface of the dielectric 30a. The discharge plasma produces ozone, active oxygen, and the like. The PM deposited on the oxidation substrate 30 is oxidized or burned by this ozone and this active oxygen, and is removed from the oxidation substrate 30.

Next, the outline of oxidation treatment control according to the first embodiment will be described. It is useful to continuously collect the PM by the dust collection device 6 while exhaust gas containing the PM is discharged from the internal combustion engine 2. On the other hand, the oxidation treatment of the PM does not need to be always carried out by the oxidation treatment device 8. The oxidation treatment may be carried out after collecting a certain amount of PM. This is because the consumption energy increases and the fuel economy of the entire vehicle deteriorates as the frequency with which the oxidation treatment is carried out is increased. It should be noted, however, that the PM deposited on the oxidation substrate 30 is detached and flows out from the exhaust gas control apparatus 10 if the oxidation treatment is carried out at a wrong timing.

Figure 2:
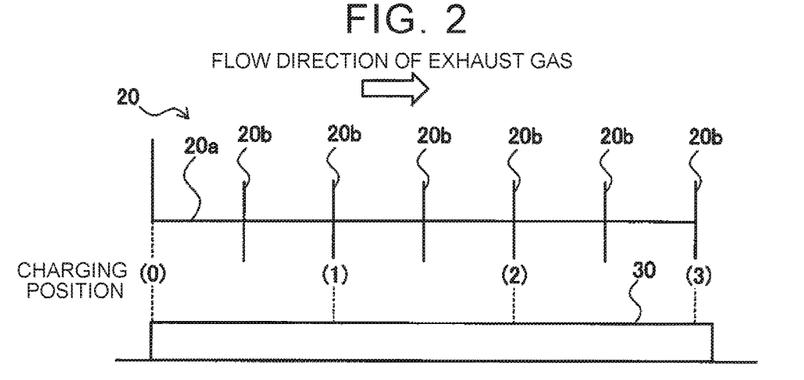
FIG. 2 is a view illustrating the definition of a charging position in a flow direction of exhaust gas.

In the present embodiment, instead of the total deposition amount of PM deposited on the oxidation substrate 30, the deposition amount of PM in each of a plurality of regions into which the oxidation substrate 30 is virtually divided in the flow direction of exhaust gas is managed. In concrete terms, as shown in, for example, FIG. 2, the oxidation substrate 30 is divided into three regions in the flow direction of exhaust gas. Each of positions 1, 2, and 3 serving as borders among the regions corresponds to the position of one of the discharge portions 20b in the flow direction of exhaust gas. The PM is charged through the discharge from the discharge portions 20b, so these positions will be referred to hereinafter as charging positions. Besides, an upstream end of the oxidation substrate 30 (or an upstream end of a charging region on the oxidation substrate 30) is defined as the charging position 0. In FIG. 2, the charging position 1 corresponds to the position of the second discharge portion 20b from the upstream side in the flow direction of exhaust gas, the charging position 2 corresponds to the position of the fourth discharge portion 20b from the upstream side in the flow direction of exhaust gas, and the charging position 3 corresponds to the position of the sixth discharge portion 20b from the upstream side in the flow direction of exhaust gas. The distance between the charging positions 0 and 1, the distance between the charging positions 1 and 2, and the distance between the charging positions 2 and 3 are all equal to one another. Incidentally, the oxidation substrate 30 is divided into three regions in the flow direction of exhaust gas in this case. However, the oxidation substrate 30 may be divided into two regions or more than three regions.

Figure 3:
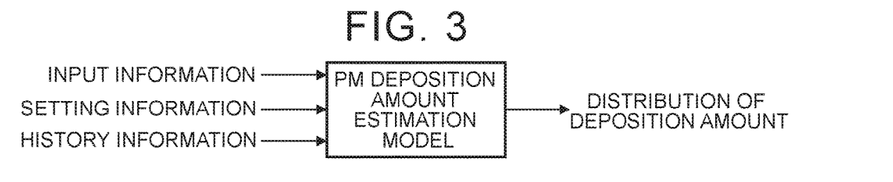
FIG. 3 is a view showing a PM deposition amount estimation model.

In the present embodiment, a deposition amount of PM from the charging position 0 to the charging position 1, a deposition amount of PM from the charging position 1 to the charging position 2, and a deposition amount of PM from the charging position 2 to the charging position 3 are estimated. That is, a distribution of the PM deposited on the oxidation substrate 30 in the flow direction of exhaust gas is estimated. A PM deposition amount estimation model shown in FIG. 3 is used for this estimation. The PM deposition amount estimation model is a physics model that estimates the distribution of the deposition amount in the flow direction of exhaust gas, based on input information as information on a condition of treated exhaust gas, setting information as information on the setting of the side of the device for collecting exhaust gas, and history information as information on the history of the oxidation treatment carried out so far.

The PM deposition amount estimation model can be expressed by, for example, a calculation formula for calculating a collection efficiency expressed by Equations 1 and 2, a calculation formula for calculating an amount of increase in the deposition amount indicated by Equations 3, 4, and 5, and a calculation formula for calculating the deposition amount indicated by Equation 6.

$$\eta_n = 1 - \exp k(-\omega e \cdot A_n / Ga) \quad \text{Equation 1}$$

$$\omega e = ve = q \cdot E \cdot Cm / (3\pi \cdot \mu \cdot dp) \quad \text{Equation 2}$$

$$\Delta Gi_1 = Qs \cdot \eta_1 \cdot \Delta T \quad \text{Equation 3}$$

$$\Delta Gi_2 = Qs \cdot \eta_2 \cdot \Delta T - \Delta Gi_1 \quad \text{Equation 4}$$

$$\Delta Gi_3 = Qs \cdot \eta_3 \cdot \Delta T - \Delta Gi - \Delta Gi_2 \quad \text{Equation 5}$$

$$G_n = \Sigma \Delta Gi_n \quad \text{Equation 6}$$

In Equation 1, $\eta_n$ denotes a collection efficiency at a charging position n, k denotes a correction coefficient peculiar to the system, $A_n$ denotes an effective substrate area (m$^2$) at the charging position n, Ga denotes a flow rate (g/s) of exhaust gas, and we denotes a separation speed (m/s). The effective substrate area $A_n$ is an area from the charging position 0 as the upstream end of the charging region to the charging position n. In Equation 2, ve denotes a phase speed of diffused charges, q denotes a charging amount (C) of particles, E denotes an intensity (V/m) of an electric field applied between the charging electrode 20 and the outer shell 12, Cm denotes the Cunningham correction coefficient, denotes a viscosity (Pa·S) of gas, and dp denotes a particle diameter (m).

In Equations 3, 4, and 5, Qs denotes an amount of PM flowing into the exhaust gas control apparatus 10 together with exhaust gas per unit deposition time (hereinafter referred to as an instantaneous inflow PM amount), and ΔT denotes the unit deposition time. Then, $\Delta Gi_1$ denotes an amount of increase in the deposition amount per unit deposition time in a section from the charging position 0 to the charging position 1, $\Delta Gi_2$ denotes an amount of increase in the deposition amount per unit deposition time in a section from the charging position 1 to the charging position 2, and $\Delta Gi_3$ denotes an amount of increase in the deposition amount per unit deposition time in a section from the charging position 2 to the charging position 3.

In Equation 6, $G_n$ denotes a deposition amount of PM in a section from a charging position n−1 to the charging position n, and $\Delta Gi_n$ denotes an amount of increase in the deposition amount per unit deposition time in a section from the charging position n−1 to the charging position n. The deposition amount $G_n$ at the moment is calculated by integrating the amount $\Delta Gi_n$ of increase in the deposition amount per unit deposition time. Among the parameters that are used in these equations, at least an exhaust gas flow rate Ga and an instantaneous inflow PM amount Qs are variables that change depending on the operating condition, and are included in the above-mentioned input condition. Besides, at least the electric field intensity E is a variable that is set in the dust collection device 6, and is included in the above-mentioned setting condition. Besides, the value of the deposition amount $G_n$ in Equation 6 is initialized based on the information on the history of the oxidation treatment. The initial value of the initialized deposition amount $G_n$ is calculated from, for example, a time for carrying out the oxidation treatment and an oxidation speed. If the oxidation treatment is carried out for a time sufficient for the deposition amount, the initial value of the deposition amount $G_n$ is set to zero.

Figure 4:
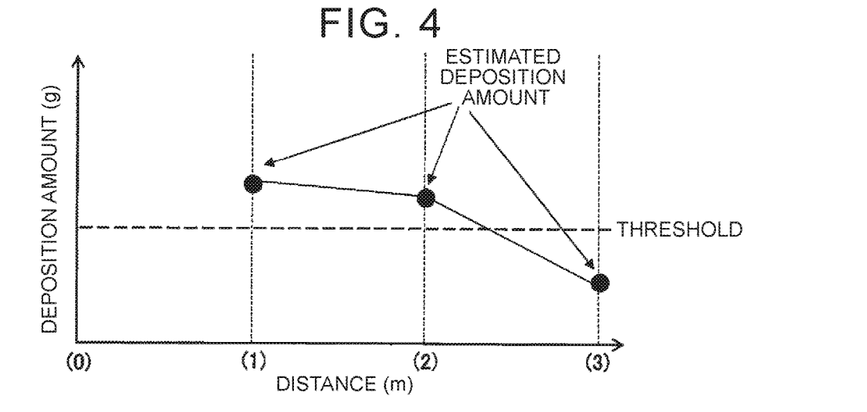
FIG. 4 is a view showing an exemplary relationship between a distance from a starting point and an estimated deposition amount.

FIG. 4 is a view showing an exemplary calculation result obtained through the use of the above-mentioned PM deposition amount estimation model. FIG. 4 graphically represents a relationship between the distance from a starting point and the estimated deposition amount when the charging position 0 is defined as the starting point. The estimated deposition amount at each of the charging position 1, the charging position 2, and the charging position 3 is obtained through calculation using the PM deposition amount estimation model. Incidentally, as described previously, for example, the estimated deposition amount at the charging position 2 means the estimated deposition amount in the section from the charging position 1 to the charging position 2.

In the present embodiment, the estimated deposition amount at each of the charging positions is compared with a preset threshold. The threshold is, for example, an upper limit of the range of the deposition amount where the detachment of the PM is confined within a permissible range. Then, when the estimated deposition amount is equal to or smaller than the threshold at all the charging positions, the oxidation treatment device 8 is held stopped. However, when the estimated deposition amount exceeds the threshold at at least one of the charging positions, the oxidation treatment device 8 is operated to carry out the oxidation treatment. In the example shown in FIG. 4, the estimated deposition amount exceeds the threshold at the charging position 1 and the charging position 2, so the oxidation treatment is carried out by the oxidation treatment device 8.

According to oxidation treatment control of the contents described above, when the deposition of the PM on the oxidation substrate 30 is biased and the deposition amount exceeds the threshold somewhere due to the bias, the oxidation treatment is carried out by the oxidation treatment device 8 even in the case where the deposition amount is sufficiently smaller than the threshold as a whole. Thus, the PM is restrained from being detached as a result of the bias in deposition of the collected PM. Therefore, the exhaust emission property is also restrained from deteriorating through the outflow of the detached PM.

Figure 5:
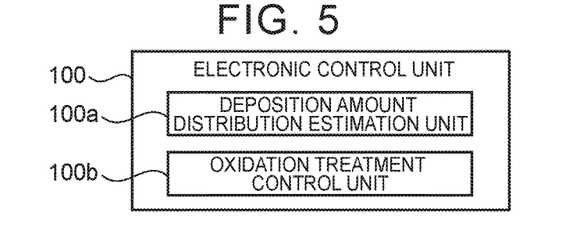
FIG. 5 is a block diagram showing the configuration of an electronic control unit according to the first embodiment.

Next, the details of oxidation treatment control adopted in the present embodiment will be described. FIG. 5 is a block diagram showing the configuration of the electronic control unit 100 according to the present embodiment. As depicted by blocks in FIG. 5, the electronic control unit 100 is equipped with a deposition amount distribution estimation unit 100a and an oxidation treatment control unit 100b. These units correspond to the computer program stored in the memory 104 of the electronic control unit 100, or a part of the computer program.

The deposition amount distribution estimation unit 100a is configured to calculate the estimated deposition amount at each of the charging positions through the use of the foregoing PM deposition amount estimation model. Then, as described in the summary, the oxidation treatment control unit 100b is configured to control the on/off state of the oxidation treatment by the oxidation treatment device 8, based on a comparison between the estimated deposition amount at each of the charging positions calculated by the deposition amount distribution estimation unit 100a and the threshold.

Figure 6:
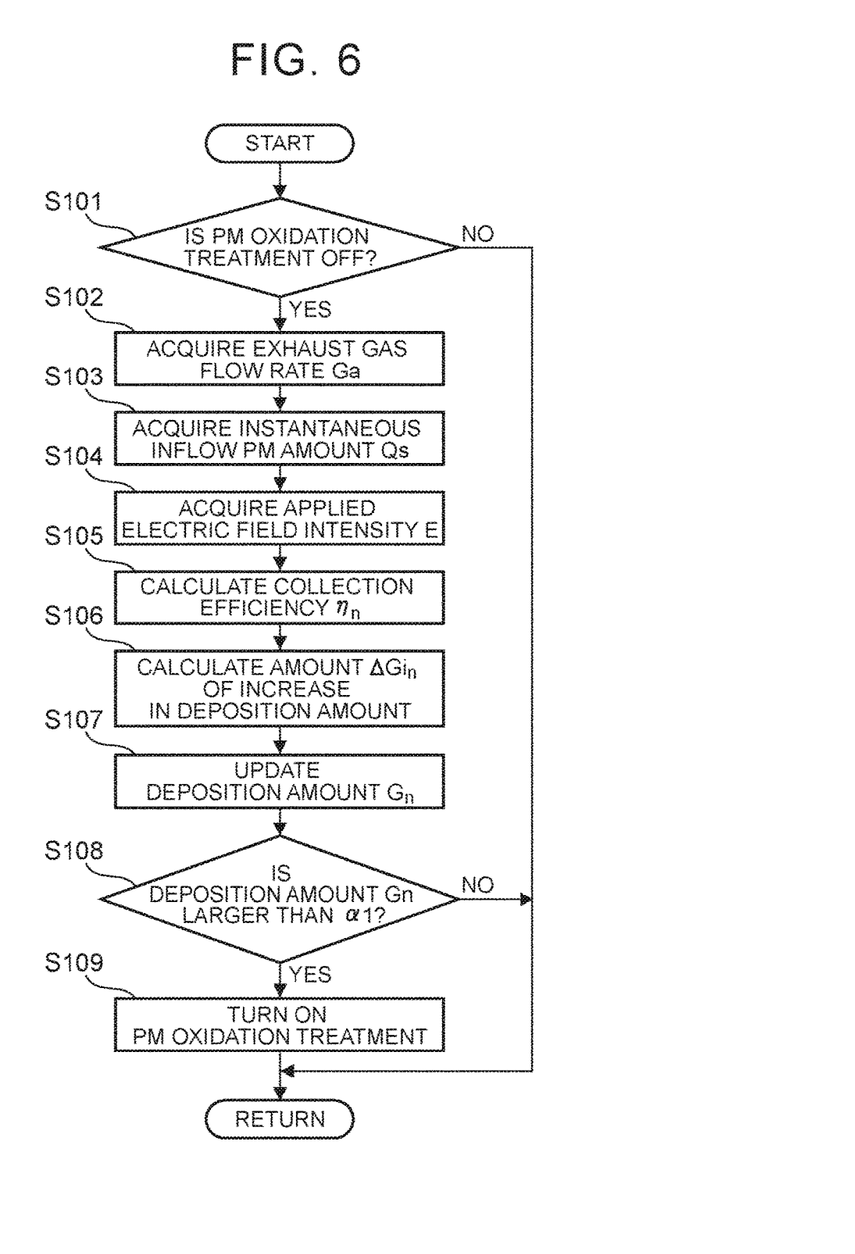
FIG. 6 is a flowchart showing the control flow of oxidation treatment control according to the first embodiment.

FIG. 6 is a flowchart showing the control flow of oxidation treatment control that is performed by the electronic control unit 100 in the present embodiment. The computer program created based on this flowchart is read out from the memory 104, and is executed by the processor 102 on a predetermined control cycle. Thus, the function of the deposition amount distribution estimation unit 100a and the function of the oxidation treatment control unit 100b are realized by the electronic control unit 100.

As shown in FIG. 6, the control flow of oxidation treatment control is constituted of processes from step S101 to step S109. The electronic control unit 100 carries out the processing that is represented by this control flow, individually for each of the charging positions 1 to 3. Incidentally, the suffix n in the flowchart means that the processing corresponding to the charging position n is carried out.

First of all, it is determined in step S101 whether or not the oxidation treatment of the PM is off, namely, whether or not the oxidation treatment fails to be carried out. If the oxidation treatment has already been carried out, the other steps are skipped, and the present control flow is ended.

If the oxidation treatment has not been carried out yet, the processes from step S101 to step S108 are carried out. In step S102, the exhaust gas flow rate Ga as a piece of input information is acquired. For example, the signal of the airflow meter 112 is used to acquire the exhaust gas flow rate Ga. In step S103, the instantaneous inflow PM amount Qs as a piece of input information is acquired. For example, a map that uses the engine rotational speed and the load factor as arguments is used to acquire the instantaneous inflow PM amount Qs. The engine rotational speed is obtained from the signal of the engine rotational speed sensor 110, and the load factor is calculated from the intake air flow rate and the engine rotational speed. In step S104, the electric field intensity E between the charging electrode 20 and the outer shell 12 as a piece of setting information is acquired. The electric field intensity E is calculated from the voltage value of a DC voltage applied between the charging electrode 20 and the outer shell 12 from the DC voltage generation device 24.

In step S105, the collection efficiency r, at the charging position n is calculated through the use of Equations 1 and 2. The exhaust gas flow rate Ga acquired in step S102 and the electric field intensity E acquired in step S104 are used for this calculation. In step S106, the amount $\Delta Gi_n$ of increase in the deposition amount at the charging position n is calculated through the use of one of Equations 3 to 5. The instantaneous inflow PM amount Qs acquired in step S103 and the collection efficiency $\eta_n$ calculated in step S105 are used for this calculation. Furthermore, in step S107, the deposition amount $G_n$ at the charging position n is updated based on the amount $\Delta Gi_n$ of increase calculated in step S106, through the use of Equation 6.

In step S108, it is determined whether or not the deposition amount $G_n$ updated in step S107 is larger than a threshold $\alpha 1$. The possibility of the deposited PM being detached to flow downstream increases as the deposition amount $G_n$ increases. The threshold $\alpha 1$ is an upper limit of the range of the deposition amount where the detachment of the PM is confined within a permissible range. In the case where the determination in step S108 is made as to all the charging positions n, if the deposition amount $G_n$ is equal to or smaller than the threshold $\alpha 1$ at all the charging positions n, the oxidation treatment of the PM is not carried out. However, if the deposition amount $G_n$ is larger than the threshold $\alpha 1$ at at least one of the charging positions n, step S109 is selected, and the oxidation treatment of the PM is carried out by the oxidation treatment device 8.

Next, the second embodiment of the disclosure will be described. The basic structure of an exhaust gas control apparatus according to the second embodiment is identical to that of the exhaust gas control apparatus according to the first embodiment. Therefore, it is recommendable to refer to FIG. 1 when the structure of the exhaust gas control apparatus is mentioned in the following description, unless otherwise specified.

Figure 7:
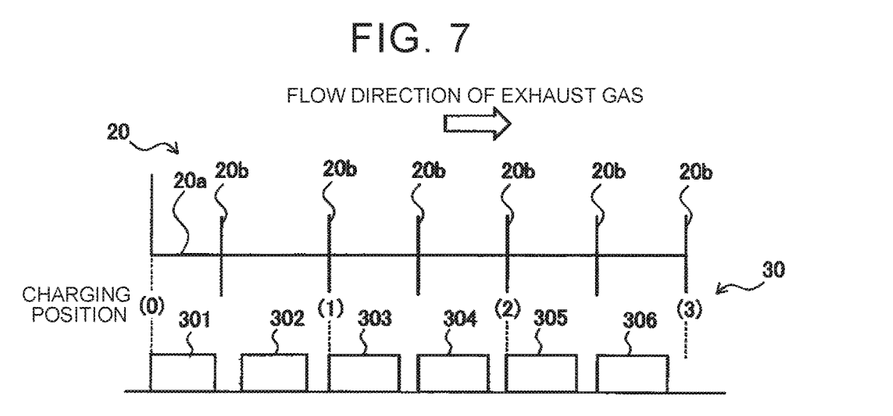
FIG. 7 is a view showing the structure of an oxidation substrate according to the second embodiment.

The present embodiment has one feature in the structure of the oxidation substrate 30. FIG. 7 is a view showing the structure of the oxidation substrate 30 according to the present embodiment. The oxidation substrate 30 according to the present embodiment is constituted of a plurality of partial substrates 301 to 306 that are aligned in the flow direction of exhaust gas. Although not shown in the drawing, each of the partial substrates 301 to 306 is provided with an oxidation electrode to which an AC voltage is applied from the AC voltage generation device 34. The oxidation electrode (hereinafter referred to as a partial electrode) provided individually for each of the partial substrates 301 to 306 and the AC voltage generation device 34 are individually connected to each other. The AC voltage generation device 34 can apply an AC voltage individually to each of the partial electrodes. That is, in the present embodiment, the oxidation treatment through the application of an AC voltage from the AC voltage generation device 34 can be carried out individually for each of the partial substrates 301 to 306.

The oxidation substrate 30 having this structure makes it possible to apply an AC voltage only to a location where the oxidation treatment is desired to be carried out, and hence to reduce the electric power consumed by the entire exhaust gas control apparatus. A concrete example of this case will be described using FIG. 8.

Figure 8:
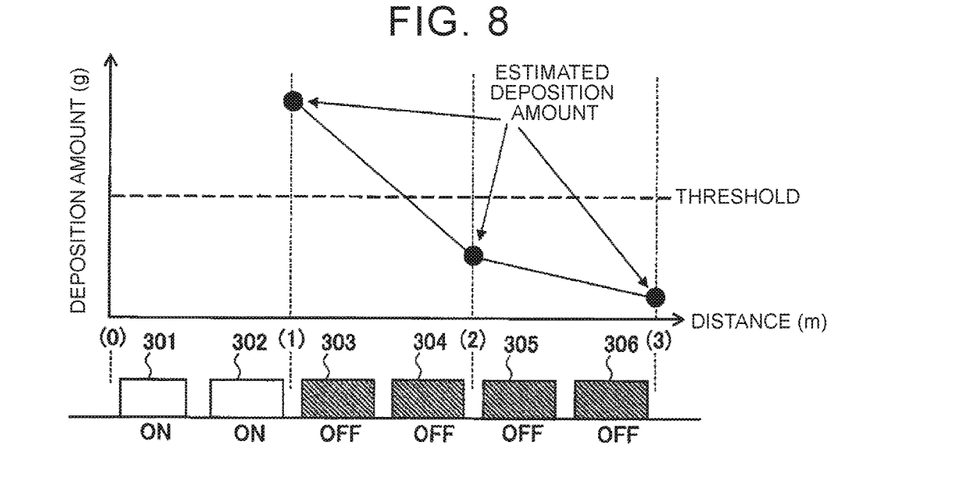
FIG. 8 is a view showing an example of on/off control of a partial electrode based on an estimated deposition amount.

FIG. 8 depicts an estimated deposition amount at each of the charging positions, and a positional relationship between each of the charging positions in the flow direction of exhaust gas and each of the partial substrates 301 to 306. In the example shown in FIG. 8, the estimated deposition amount at the charging position 1 exceeds the threshold, and the estimated deposition amount at each of the charging positions 2 and 3 does not exceed the threshold. In this case, it can be determined that the region where the deposited PM is highly likely to be detached is the region from the charging position 0 to the charging position 1.

In the example shown in FIG. 8, the partial substrates 301 and 302 correspond to the region from the charging position 0 to the charging position 1. In the present embodiment, therefore, the oxidation treatment is carried out not by the partial substrates 303 to 306 but only by the partial substrates 301 and 302. In FIG. 8, "ON" means that an AC voltage is applied to the partial electrode in each of the corresponding partial substrates, and "OFF" means that no AC voltage is applied to the partial electrode in each of the corresponding partial substrates. By carrying out the oxidation treatment only in the region where the PM may be detached in this manner, the PM can be restrained from being detached while holding the amount of electric power consumption small.

Figure 9:
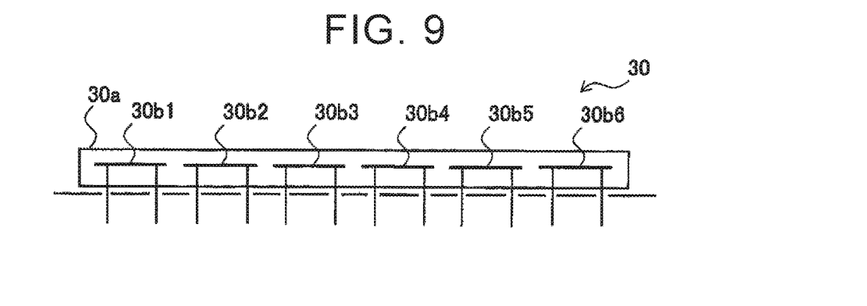
FIG. 9 is a view showing the structure of a modification example of the oxidation substrate according to the second embodiment.

Incidentally, the oxidation substrate 30 according to the present embodiment can also be modified as shown in FIG. 9. In the modification example shown in FIG. 9, a plurality of partial electrodes 30b1 to 30b6 that are independent of one another are aligned in the flow direction of exhaust gas. These partial electrodes 30b1 to 30b6 are provided in the same substrate in such a manner as to share the single dielectric 30a. By controlling the application of an AC voltage to each of the partial electrodes 30b1 to 30b6 and the stop of application of the AC voltage thereto, the oxidation treatment can be carried out individually for each of the partial electrodes 30b1 to 30b6.

The present embodiment also has one feature in the method of calculating the deposition amount of the PM through the use of a PM deposition amount estimation model. As described above, in the present embodiment, the oxidation treatment can be carried out individually for each of the partial electrodes. Therefore, the degree of decrease in the deposition amount of the PM caused by carrying out the oxidation treatment also differs depending on each of the partial electrodes. Thus, in the present embodiment, with a view to more accurately estimating the distribution of the deposition amount of the PM in the flow direction of exhaust gas, the estimated deposition amount of the PM at each of the charging positions is calculated through the use of the PM deposition amount estimation model configured as will be described below.

The PM deposition amount estimation model according to the present embodiment can be expressed by, for example, the calculation formula for calculating the collection efficiency expressed by the foregoing Equations 1 and 2, the calculation formula for calculating the amount of increase in the deposition amount indicated by the foregoing Equations 3, 4, and 5, a calculation formula for calculating an oxidation amount of PM indicated by Equation 7, a calculation formula for calculating an amount of change in the deposition amount indicated by Equation 8, and a calculation formula for calculating the deposition amount indicated by Equation 9 instead of Equation 6.

$$\Delta Gd_n = Z \cdot V \cdot \Delta T \qquad \text{Equation 7}$$

$$\Delta G_n = \Delta Gi_n - \Delta Gd_n \qquad \text{Equation 8}$$

$$G_n = \Sigma \Delta G_n \qquad \text{Equation 9}$$

In Equation 7, $\Delta Gd_n$ denotes an oxidation amount of PM per unit deposition time in the section from the charging position n−1 to the charging position n, Z denotes an eigenvalue of the substrate as an oxidation capacity of the substrate, and V denotes an oxidation speed (g/s) of PM. The oxidation speed V depends on the magnitude of the AC voltage applied to each of the partial electrodes. Therefore, if the magnitude of the applied AC voltage is controlled individually for each of the partial electrodes, the value of the oxidation speed V is treated not as a constant that is common among the charging positions but as a variable that differs depending on the charging position n.

In Equation 8, $\Delta G_n$ denotes an amount of change in the deposition amount per unit deposition time in the section from the charging position n−1 to the charging position n. The deposition amount decreases as the PM is removed through the oxidation treatment. Therefore, the amount $\Delta G_n$ of change in the deposition amount per unit deposition time is an amount that is obtained by subtracting the oxidation amount $\Delta Gd_n$ of PM per unit deposition time from the amount $\Delta Gi_n$ of increase in the deposition amount per unit deposition time.

In Equation 9, the deposition amount $G_n$ at the moment is calculated by integrating the amount $\Delta G_n$ of change in the deposition amount per unit deposition time. In the present embodiment, the deposition amount $G_n$ estimated through the use of Equations 1 to 5 and 7 to 9 is used in oxidation treatment control.

Next, the details of oxidation treatment control adopted in the present embodiment will be described. The configuration of the electronic control unit 100 for performing oxidation treatment control is identical to that of the first embodiment, and is depicted as the blocks in FIG. 5. The electronic control unit 100 according to the present embodiment is also equipped with the deposition amount distribution estimation unit 100a and the oxidation treatment control unit 100b. The deposition amount distribution estimation unit 100a is configured to calculate an estimated deposition amount at each of the charging positions through the use of the foregoing PM deposition amount estimation model. The oxidation treatment control unit 100b is configured to control the on/off state of the oxidation treatment by the oxidation treatment device 8, individually for each of the partial electrodes, based on a comparison between the estimated deposition amount at each of the charging positions calculated by the deposition amount distribution estimation unit 100a and a threshold.

Figure 10:
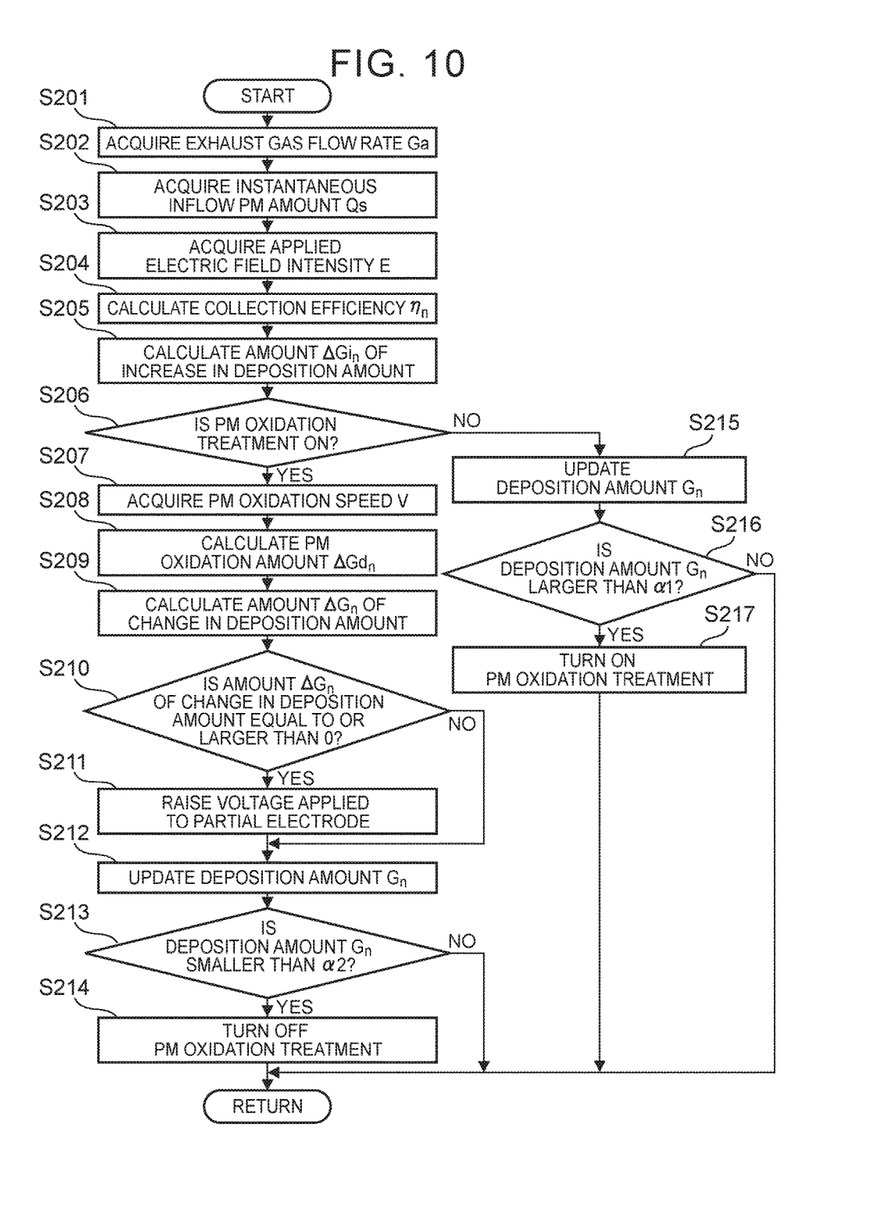
FIG. 10 is a flowchart showing the control flow of oxidation treatment control according to the second embodiment.

FIG. 10 is a flowchart showing the control flow of oxidation treatment control that is performed by the electronic control unit 100 in the present embodiment. A computer program created based on this flowchart is read out from the memory 104 and executed on a predetermined control cycle by the processor 102. Thus, the function of the deposition amount distribution estimation unit 100a and the function of the oxidation treatment control unit 100b are realized in the electronic control unit 100.

As shown in FIG. 10, the control flow of oxidation treatment control is constituted of processes from step S201 to step S217. The electronic control unit 100 performs the processing represented by this control flow individually for each of the charging positions 1 to 3. Incidentally, the suffix n in the flowchart means that the processing corresponding to the charging position n is carried out.

In step S201, the exhaust gas flow rate Ga as a piece of input information is acquired. In step S202, the instantaneous inflow PM amount Qs as a piece of input information is acquired. In step S203, the electric field intensity E between the charging electrode 20 and the outer shell 12 as a piece of setting information is acquired.

In step S204, the collection efficiency $\eta_n$ at the charging position n is calculated through the use of Equations 1 and 2. The exhaust gas flow rate Ga acquired in step S201 and the electric field intensity E acquired in step S203 are used for this calculation. In step S205, the amount $\Delta Gi_n$ of increase in the deposition amount at the charging position n is calculated through the use of one of Equations 3 to 5. The instantaneous inflow PM amount Qs acquired in step S202 and the collection efficiency fl, calculated in step S204 are used for this calculation.

In step S206, it is determined whether or not the oxidation treatment of the PM by the partial electrode corresponding to the charging position n is on, namely, whether or not the oxidation treatment is being carried out by the partial electrode corresponding to the charging position n. If the oxidation treatment is not being carried out, the control flow proceeds to step S215.

In step S215, the deposition amount $G_n$ at the charging position n is updated based on the amount $\Delta Gi_n$ of increase in the deposition amount calculated in step S205. Since the oxidation treatment is not being carried out, the oxidation amount of PM is equal to zero, and the amount $\Delta G_n$ of change in the deposition amount per unit deposition time in Equation 8 is equal to the amount $\Delta Gi_n$ of increase in the deposition time per unit deposition time.

In step S216, it is determined whether or not the deposition amount $G_n$ updated in step S215 is larger than the threshold $\alpha 1$. If the deposition amount $G_n$ is larger than the threshold $\alpha 1$, step S217 is selected. In step S217, an AC voltage is applied to the partial electrode corresponding to the charging position n, and the oxidation treatment is carried out by the partial electrode corresponding to the charging position n. For example, in the example shown in FIG. 7, if the deposition amount $G_2$ at the charging position 2 becomes larger than the threshold $\alpha 1$, an AC voltage is applied to each of the partial electrodes of the partial substrates 303 and 304, and the oxidation treatment is carried out by the partial electrodes. On the other hand, if the deposition amount $G_n$ is smaller than the threshold $\alpha 1$, no AC voltage is applied to the partial electrode corresponding to the charging position n, and the oxidation treatment remains stopped from being carried out.

If the oxidation treatment has already been carried out by the partial electrode corresponding to the charging position n in step S206, the control flow proceeds to step S207. In step S207, the oxidation speed V of PM is acquired. The oxidation speed V is calculated from a voltage value of the AC voltage applied to the partial electrode corresponding to the charging position n from the AC voltage generation device 34. In step S208, the oxidation amount $\Delta Gd_n$ of PM at the charging position n is calculated through the use of Equation 7. The oxidation speed V acquired in step S207 is used for this calculation. Then, in step S209, the amount $\Delta G_n$ of change in the deposition amount at the charging position n is calculated through the use of Equation 8. The amount $\Delta Gi_n$ of increase in the deposition amount calculated in step S205 and the oxidation amount $\Delta Gd_n$ of PM calculated in step S208 are used for this calculation.

In step S210, it is determined whether or not the amount $\Delta G_n$ of change in the deposition amount calculated in step S209 is equal to or larger than zero. If the amount $\Delta G_n$ of change in the deposition amount is smaller than zero, the deposition amount of PM decreases due to the effect of the oxidation treatment. However, if the amount $\Delta G_n$ of change in the deposition amount is equal to or larger than zero, the deposition amount of PM remains unchanged or increases although the oxidation treatment is carried out. Only if the amount $\Delta G_n$ of change in the deposition amount is equal to or larger than zero, step S211 is selected. In step S211, the voltage value of the AC voltage applied to the partial electrode corresponding to the charging position n from the AC voltage generation device 34 is raised. When the voltage value of the applied voltage is raised, the oxidation amount $\Delta Gd_n$ of PM increases due to a rise in the oxidation speed V of PM, so the amount $\Delta G_n$ of change in the deposition amount decreases.

In step S212, the deposition amount $G_n$ at the charging position n is updated based on the amount $\Delta G_n$ of change in the deposition amount calculated in step S209, through the use of Equation 9.

In step S213, it is determined whether or not the deposition amount $G_n$ updated in step S212 is smaller than a threshold $\alpha 2$. If the deposition amount $G_n$ is smaller than the threshold $\alpha 2$, step S214 is selected. In step S214, the AC voltage is stopped from being applied to the partial electrode corresponding to the charging position n, and the oxidation treatment is stopped from being carried out by the partial electrode corresponding to the charging position n. That is, the condition determined in step S213 is a stop condition for stopping the oxidation treatment from being carried out by the partial electrode corresponding to the charging position n. In order to avoid the chattering of the turning on/off of the oxidation treatment, the threshold $\alpha 2$ is set smaller than the threshold $\alpha 1$.

Next, the third embodiment of the disclosure will be described. The basic structure of an exhaust gas control apparatus according to the third embodiment is identical to that of the exhaust gas control apparatus according to the first embodiment. Therefore, it is recommendable to refer to FIG. 1 when the structure of the exhaust gas control apparatus is mentioned in the following description, unless otherwise specified.

The present embodiment has one feature in the function of the dust collection device 6. The dust collection device 6 according to the present embodiment is configured such that each of the plurality of the discharge portions 20b belonging to the charging electrode 20 can be individually discharged. A concrete structure for realizing this function will be described later. By assigning this function to the dust collection device 6, charging position control that will be described below can be performed.

Figure 11:
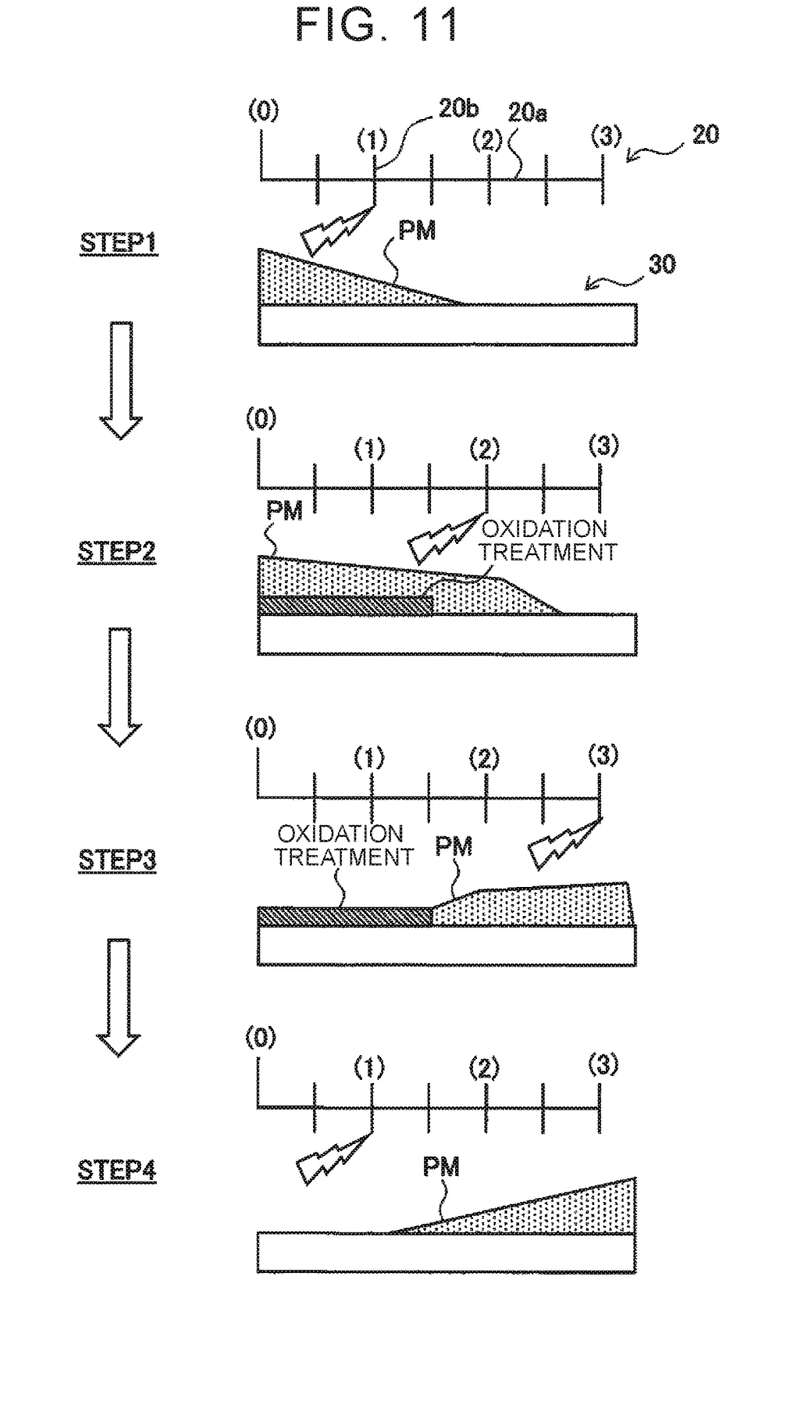
FIG. 11 is a view showing the outline of charging position control according to the third embodiment.

FIG. 11 is a view showing the outline of charging position control. Charging position control is the control of sequentially changing over that one of the discharge portions 20b which is to be discharged and changing the charging position on the oxidation substrate 30. By changing the charging position on the oxidation substrate 30, the distribution of the deposition amount of PM on the oxidation substrate 30 can also be changed. In charging position control, that one of the discharge portions 20b which is to be discharged is changed over in accordance with the change in the distribution of the deposition amount. More specifically, the discharge portion 20b is changed over to a position on the oxidation substrate 30 where the deposition amount is small. Thus, the bias in the deposition of PM in the flow direction of exhaust gas is reduced.

A concrete example of charging position control will now be described through the use of FIG. 11. FIG. 11 depicts an example in which that one of the discharge portions 20b which is to be discharged is changed over among the three discharge portions 20b corresponding to the charging positions 1, 2, and 3 respectively. Besides, in this concrete example, oxidation treatment control described in the second embodiment, namely, the control of carrying out the oxidation treatment individually for each of the partial electrodes that are aligned in the flow direction of exhaust gas is combined with charging position control.

In STEP 1 shown in FIG. 11, the discharge portion 20b corresponding to the charging position 1 is discharged. Due to this discharge, PM is deposited in the region close to the charging position 1 on the oxidation substrate 30. In STEP 2 following STEP 1, the oxidation treatment is carried out by the partial electrode corresponding to the charging position 1, and that one of the discharge portions 20b which is to be discharged is changed over to the discharge portion 20b corresponding to the charging position 2. Thus, the PM deposited in the region corresponding to the charging position 1 is subjected to the oxidation treatment and decreases in amount. In STEP 3 following STEP 2, that one of the discharge portions 20b which is to be discharged is changed over to the discharge portion 20b corresponding to the charging position 3. Thus, the region on the oxidation substrate 30 where PM is deposited shifts downstream in the flow direction of exhaust gas. Then, in STEP 4 following STEP 3, that one of the discharge portions 20b which is to be discharged is changed over again to the discharge portion 20b corresponding to the charging position 1. Thus, the region on the oxidation substrate 30 where PM is deposited shifts again upstream in the flow direction of exhaust gas, so the distribution of the deposition amount of PM on the oxidation substrate 30 is homogenized.

Figure 12:
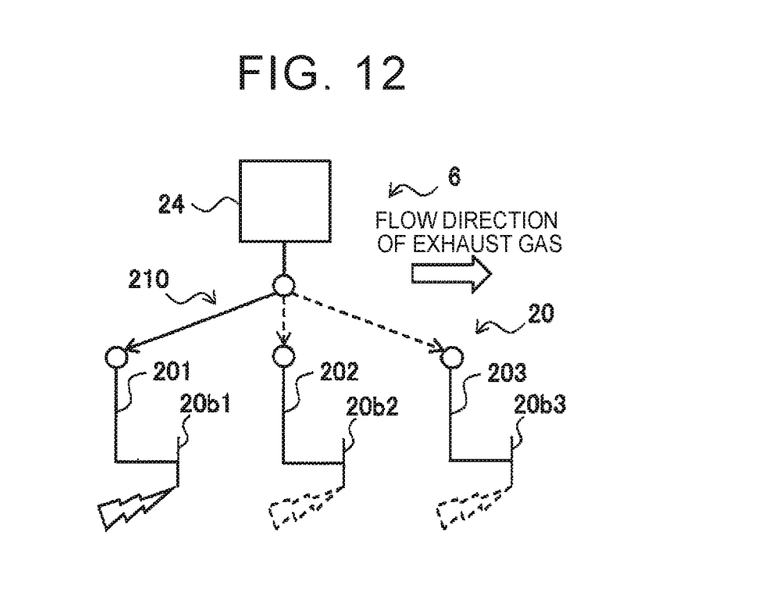
FIG. 12 is a view showing an example of the structure of a dust collection device according to the third embodiment.

FIG. 12 is a view showing an example of the structure of the dust collection device 6 for realizing the above-mentioned charging position control. In the example shown in FIG. 12, the charging electrode 20 belonging to the dust collection device 6 is constituted of three partial charging electrodes 201, 202, and 203 that are aligned in the flow direction of exhaust gas. The partial charging electrodes 201, 202, and 203 are provided with discharge portions 20b1, 20b2, and 20b3 respectively. In this example, the dust collection device 6 connects the partial charging electrodes 201, 202, and 203 to the DC voltage generation device 24 by a changeover switch 210. By operating the changeover switch 210, the connection between the discharge portions 20b1, 20b2, and 20b3 and the DC voltage generation device 24 can be changed over, and only the selected discharge portion can be discharged by applying a DC voltage thereto.

Figure 13:
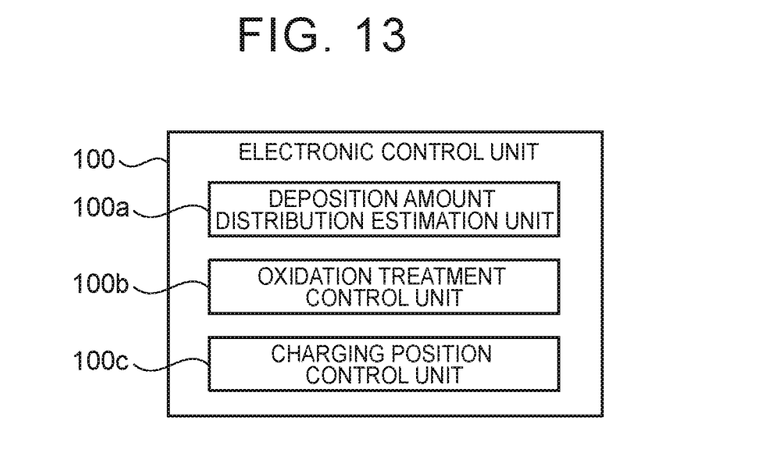
FIG. 13 is a block diagram showing the configuration of an electronic control unit according to the third embodiment.

Next, the details of oxidation treatment control and charging position control adopted in the present embodiment will be described. FIG. 13 is a block diagram showing the configuration of the electronic control unit 100 according to the present embodiment. As depicted by blocks in FIG. 13, the electronic control unit 100 is equipped with the deposition amount distribution estimation unit 100a, the oxidation treatment control unit 100b, and a charging position control unit 100c. These units correspond to the computer program stored in the memory 104 of the electronic control unit 100 or a part thereof.

The deposition amount distribution estimation unit 100a is configured to calculate an estimated deposition amount at each of the charging positions through the use of the PM deposition amount estimation model described in the second embodiment. The oxidation treatment control unit 100b is configured to control the on/off state of the oxidation treatment by the oxidation treatment device 8 individually for each of the partial electrodes, based on a comparison between the estimated deposition amount at each of the charging positions calculated by the deposition amount distribution estimation unit 100a and a threshold. The charging position control unit 100c is configured to change over that one of the discharge portions which is to be discharged in accordance with the change in the distribution of the deposition amount of PM, and to change the charging position on the oxidation substrate 30.

Figure 14:
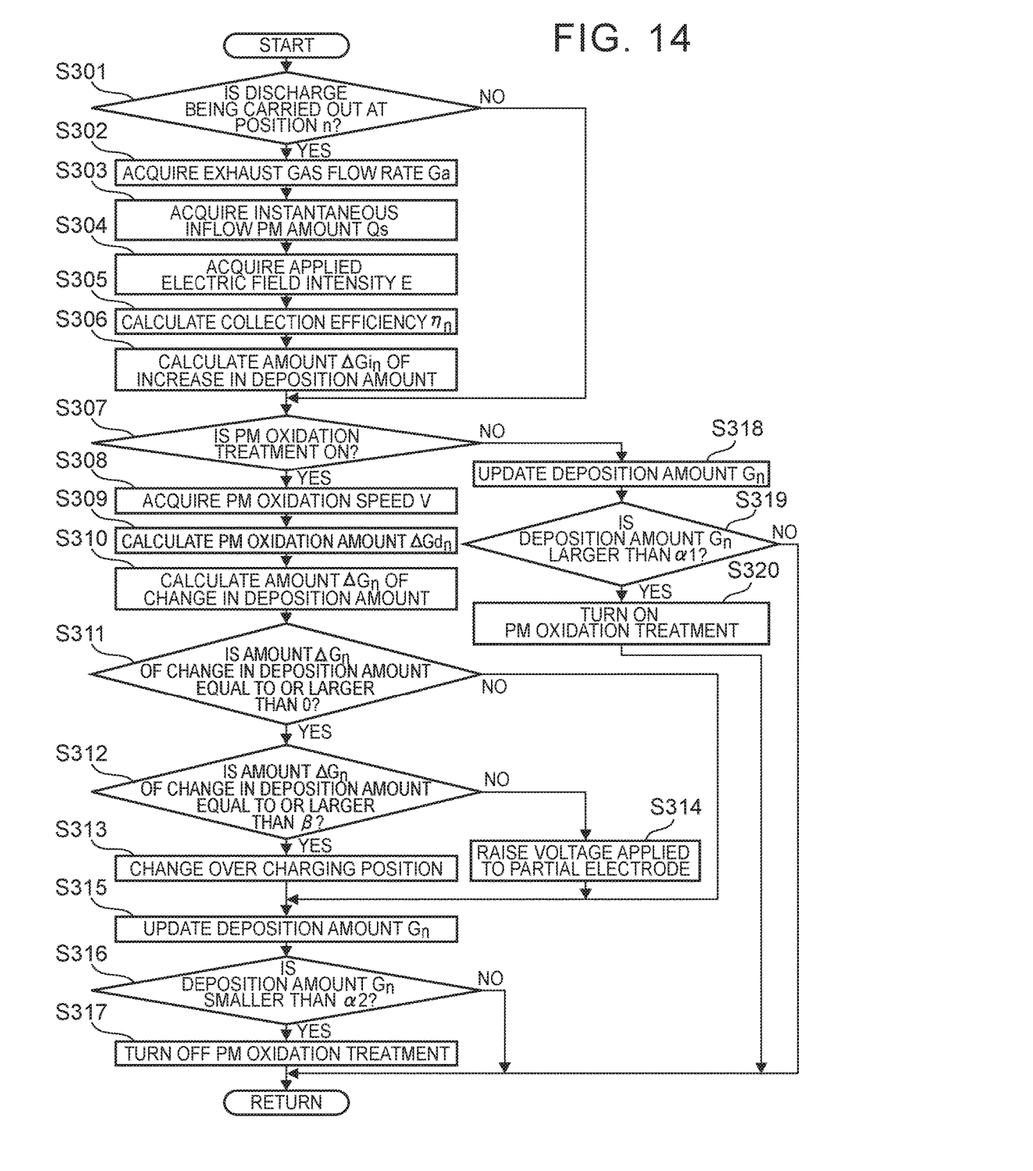
FIG. 14 is a flowchart showing the control flow of oxidation treatment control and charging position control according to the third embodiment.

FIG. 14 is a flowchart showing the control flow of oxidation treatment control and charging position control performed by the electronic control unit 100 in the present embodiment. A computer program created based on this flowchart is read out from the memory 104, and is executed on a predetermined control cycle by the processor 102. Thus, the respective functions of the deposition amount distribution estimation unit 100a, the oxidation treatment control unit 100b, and the charging position control unit 100c are realized by the electronic control unit 100.

As shown in FIG. 14, the control flow of oxidation treatment control and charging position control is constituted of processes from step S301 to step S320. The electronic control unit 100 carries out the processing represented by this control flow, individually for each of the charging positions 1 to 3. Incidentally, the suffix n in the flowchart means that the processing corresponding to the charging position n is carried out.

In step S301, it is determined whether or not static dust collection is being carried out through discharge at the charging position n. If discharge is being carried out at the charging position n, the processes from step S302 to step S306 are carried out. If discharge is not being carried out at the charging position n, these steps are skipped.

In step S302, the exhaust gas flow rate Ga as a piece of input information is acquired. In step S303, the instantaneous inflow PM amount Qs as a piece of input information is acquired. In step S304, the electric field intensity E between the charging electrode 20 and the outer shell 12 as a piece of setting information is acquired.

In step S305, the collection efficiency Y, at the charging position n is calculated through the use of Equations 1 and 2. The exhaust gas flow rate Ga acquired in step S302 and the electric field intensity E acquired in step S304 are used for this calculation. In step S306, the amount $\Delta Gi_n$ of increase in the deposition amount at the charging position n is calculated through the use of one of Equations 3 to 5. The instantaneous inflow PM amount Qs acquired in step S303 and the collection efficiency $\eta_n$ calculated in step S305 are used for this calculation.

In step S307, it is determined whether or not the oxidation treatment of the PM by the partial electrode corresponding to the charging position n is on, namely, whether or not the oxidation treatment is being carried out by the partial electrode corresponding to the charging position n. If the oxidation treatment is not being carried out, the control flow proceeds to step S318.

In step S318, the deposition amount $G_n$ at the charging position n is updated based on the amount $\Delta Gi_n$ of increase in the deposition amount calculated in step S306. Since the oxidation treatment is not being carried out, the oxidation amount of PM is equal to zero, and the amount $\Delta G_n$ of change in the deposition amount per unit deposition time in Equation 8 is equal to the amount $\Delta Gi_n$ of increase in the deposition amount per unit deposition time.

In step S319, it is determined whether or not the deposition amount $G_n$ updated in step S318 is larger than the threshold $\alpha 1$. If the deposition amount $G_n$ is larger than the threshold $\alpha 1$, step S320 is selected. In step S320, an AC voltage is applied to the partial electrode corresponding to the charging position n, and the oxidation treatment is carried out by the partial electrode corresponding to the charging position n. If the deposition amount $G_n$ is smaller than the threshold $\alpha 1$, no AC voltage is applied to the partial electrode corresponding to the charging position n, and the oxidation treatment remains stopped from being carried out.

In step S307, if the oxidation treatment has already been carried out by the partial electrode corresponding to the charging position n, the control flow proceeds to step S308. In step S308, the oxidation speed V of PM is acquired. The oxidation speed V is calculated from the voltage value of the AC voltage applied to the partial electrode corresponding to the charging position n from the AC voltage generation device 34. In step S309, the oxidation amount $\Delta Gd_n$ of PM at the charging position n is calculated through the use of Equation 7. The oxidation speed V acquired in step S308 is used for this calculation. Then, in step S310, the amount $\Delta G_n$ of change in the deposition amount at the charging position n is calculated through the use of Equation 8. The amount $\Delta Gi_n$ of increase in the deposition amount calculated in step S306 and the oxidation amount $\Delta Gd_n$ of PM calculated in step S309 are used for this calculation.

In step S311, it is determined whether or not the amount $\Delta G_n$ of change in the deposition amount calculated in step S310 is equal to or larger than zero. If the amount $\Delta G_n$ of change in the deposition amount is smaller than zero, the deposition amount of PM decreases due to the effect of the oxidation treatment. In this case, steps S312 to S314 are skipped, and the control routine proceeds to step S315. On the other hand, if the amount $\Delta G_n$ of change in the deposition amount is equal to or larger than zero, the control routine further proceeds to step S312 to determine whether or not the amount $\Delta G_n$ of change in the deposition amount calculated in step S310 is equal to or larger than a predetermined threshold $\beta$ that is larger than zero.

If the amount $\Delta G_n$ of change in the deposition amount is smaller than the threshold 3, step S314 is selected. In step S314, the voltage value of the AC voltage applied to the partial electrode corresponding to the charging position n from the AC voltage generation device 34 is raised. That is, when the oxidation amount $\Delta Gd_n$ of PM is just slightly smaller than the amount $\Delta Gi_n$ of increase in the deposition amount, the oxidation speed V of PM is raised by enhancing the applied voltage. The amount $\Delta G_n$ of change in the deposition amount represents the difference between the deposition speed of PM at the charging position n and the oxidation speed of PM.

If the amount $\Delta G_n$ of change in the deposition amount is larger than the threshold $\beta$, step S313 is selected. In step S313, the charging position is changed over from the current position to another position by changing over that one of the discharge portions which is to be discharged from the current discharge portion to another discharge portion. This is because of the following reason. That is, in the case where the amount $\Delta Gi_n$ of increase in the deposition amount is much larger than the oxidation amount $\Delta Gd_n$ of PM, namely, in the case where the deposition speed of PM at the charging position n is much higher than the oxidation speed of PM, even when the applied voltage is enhanced to raise the oxidation speed V of PM, the deposited PM may be detached due to a delay in the oxidation treatment. In such a case, the deposited PM can be restrained from being detached, by stopping any more PM from being deposited through a changeover in the charging position. Incidentally, a position where the distribution of the deposition amount of PM in the flow direction of exhaust gas can be made more homogeneous is selected as the charging position as a changeover destination.

In step S315, the deposition amount $G_n$ at the charging position n is updated based on the amount $\Delta G_n$ of change in the deposition amount calculated in step S310, through the use of Equation 9.

In step S316, it is determined whether or not the deposition amount $G_n$ updated in step S315 is smaller than the threshold $\alpha 2$. If the deposition amount $G_n$ is smaller than the threshold $\alpha 2$, step S317 is selected. In step S317, the AC voltage is stopped from being applied to the partial electrode corresponding to the charging position n, and the oxidation treatment is stopped from being carried out by the partial electrode corresponding to the charging position n.

What is claimed is:

1. An exhaust gas control apparatus comprising:
   a dust collection device configured to apply a direct current voltage between a charging electrode and a counter electrode, and to collect particulate matter on an oxidation substrate that is arranged inside the counter electrode, the charging electrode being arranged in a flow channel for exhaust gas containing particulate matter, and the counter electrode constituting at least a part of an inner wall surface of the flow channel;
   an oxidation treatment device configured to apply an alternating current voltage between an oxidation electrode and the counter electrode, and to subject the particulate matter deposited on the oxidation substrate to an oxidation treatment, the oxidation electrode being provided in the oxidation substrate and being at least partially covered with a dielectric; and
   an electronic control unit configured to control the dust collection device and the oxidation treatment device,
   the electronic control unit being configured to estimate a distribution of a deposition amount of the particulate matter deposited on the oxidation substrate in a flow direction of exhaust gas, based on input information including at least a flow rate of exhaust gas and a mass of the particulate matter in exhaust gas, setting information including at least an electric field intensity between the charging electrode and the counter electrode, and history information on the oxidation treatment by the oxidation treatment device, and
   the electronic control unit being configured to carry out the oxidation treatment by the oxidation treatment device when the deposition amount of at least a part of the deposited particulate matter exceeds a threshold.

2. The exhaust gas control apparatus according to claim 1, wherein
   the oxidation electrode is constituted of a plurality of partial electrodes that are aligned in the flow direction of exhaust gas, and the oxidation treatment device is configured to be able to carry out the oxidation treatment individually for each of the partial electrodes.

3. The exhaust gas control apparatus according to claim 2, wherein
the electronic control unit is configured to carry out the oxidation treatment by that one of the partial electrodes which corresponds to a region where the deposition amount exceeds the threshold.

4. The exhaust gas control apparatus according to claim 1, wherein
the charging electrode includes a plurality of discharge portions that are aligned in the flow direction of exhaust gas,
the dust collection device is configured to be able to carry out discharge individually for each of the discharge portions, and
the electronic control unit is configured to change a charging position on the oxidation substrate by changing over that one of the discharge portions which is to be discharged.

5. The exhaust gas control apparatus according to claim 4, wherein
the electronic control unit is configured to change over that one of the discharge portions which is to be discharged, in accordance with a change in the distribution of the deposition amount.

6. The exhaust gas control apparatus according to claim 5, wherein
the oxidation electrode is constituted of a plurality of partial electrodes that are aligned in the flow direction of exhaust gas,
the oxidation treatment device is configured to be able to carry out the oxidation treatment individually for each of the partial electrodes,
the electronic control unit is configured to carry out the oxidation treatment by that one of the partial electrodes which corresponds to a region where the deposition amount exceeds the threshold, and
the electronic control unit is configured to change over that one of the discharge portions which is to be discharged in such a manner as to shift the charging position from a position of that one of the partial electrodes for which the oxidation treatment is carried out to another position, when a deposition speed of the particulate matter at the position of that one of the partial electrodes for which the oxidation treatment is carried out is higher than an oxidation speed of the particulate matter.

7. A control method for an exhaust gas control apparatus that includes a dust collection device, an oxidation treatment device, and an electronic control unit, the dust collection device being configured to apply a direct current voltage between a charging electrode and a counter electrode, and to collect particulate matter on an oxidation substrate that is arranged inside the counter electrode, the charging electrode being arranged in a flow channel for exhaust gas containing particulate matter, and the counter electrode constituting at least a part of an inner wall surface of the flow channel, the oxidation treatment device being configured to apply an alternating current voltage between an oxidation electrode and the counter electrode, and to subject the particulate matter deposited on the oxidation substrate to an oxidation treatment, the oxidation electrode being provided in the oxidation substrate and being at least partially covered with a dielectric, and the electronic control unit being configured to control the dust collection device and the oxidation treatment device,
the control method comprising:
estimating, by the electronic control unit, a distribution of a deposition amount of the particulate matter deposited on the oxidation substrate in a flow direction of exhaust gas, based on input information including at least a flow rate of exhaust gas and a mass of the particulate matter in exhaust gas, setting information including at least an electric field intensity between the charging electrode and the counter electrode, and history information on the oxidation treatment by the oxidation treatment device; and
carrying out, by the electronic control unit, the oxidation treatment by the oxidation treatment device when the deposition amount of at least a part of the deposited particulate matter exceeds a threshold.

* * * * *

UNITED STATES PATENT AND TRADEMARK OFFICE
CERTIFICATE OF CORRECTION

PATENT NO. : 10,138,792 B2
APPLICATION NO. : 15/958498
DATED : November 27, 2018
INVENTOR(S) : Kazuhiro Sugimoto It is certified that error appears in the above-identified patent and that said Letters Patent is hereby corrected as shown below:

In the Specification

In Column 8, Line 8, before "denotes", delete "we" and insert --$\omega e$--, therefor.

In Column 10, Line 22, delete "efficiency r" and insert --efficiency $\eta_n$--, therefor.

In Column 13, Line 29, delete "efficiency fl" and insert --efficiency $\eta_n$--, therefor.

In Column 16, Line 54, delete "efficiency Y" and insert --efficiency $\eta_n$ --, therefor.

In Column 17, Line 53, delete "threshold 3" and insert --threshold $\beta$--, therefor.

Signed and Sealed this
Twenty-sixth Day of February, 2019

Andrei Iancu
*Director of the United States Patent and Trademark Office*